(12) United States Patent
Chen et al.

(10) Patent No.: US 6,671,082 B2
(45) Date of Patent: Dec. 30, 2003

(54) OPTICAL SWITCH

(75) Inventors: Huang-kun Chen, Tao Yuan (TW); Shih-chien Chang, Taipei (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 10/186,934

(22) Filed: Jun. 28, 2002

(65) Prior Publication Data

US 2003/0117684 A1 Jun. 26, 2003

(30) Foreign Application Priority Data

Dec. 25, 2001 (TW) .................... 90132268 A

(51) Int. Cl.⁷ .................... G02F 1/29; G02B 6/26
(52) U.S. Cl. .................... 359/298; 385/16; 385/17; 385/18; 385/24
(58) Field of Search .................... 359/298, 299, 359/318, 320, 260, 732; 385/14, 24, 16–18; 372/20, 32, 18, 99, 106

(56) References Cited

U.S. PATENT DOCUMENTS 6,449,407 B1 * 9/2002 Kiang et al. .................... 385/18
6,591,031 B2 * 7/2003 Wu et al. .................... 385/18

* cited by examiner

*Primary Examiner*—Hung Xuan Dang
*Assistant Examiner*—Tuyen Tra
(74) *Attorney, Agent, or Firm*—Martine & Penilla, LLP

(57) ABSTRACT

An optical switch includes two optical input terminals, two optical output terminals, two reflecting devices and a movable device. The optical input terminals are used to receive light rays. The two reflecting devices are positioned at fixed positions, and the movable device reflects light rays. When the position of the movable device moves, the light rays are reflected by one of the reflecting devices and are selectively output from the optical output terminals.

20 Claims, 4 Drawing Sheets

OPTICAL SWITCH

BACKGROUND OF THE INVENTION

1. Field of the Invention

The invention relates to an optical switch, and in particular, to a 2×2 optical switch using a movable reflecting device to switch the optical path.

2. Description of the Related Art

An optical switch is a device which switches a light ray from one input terminal to a target output terminal and possesses the function of switching a transmitting path of the light ray to switch signal sources, receive terminals and failure points, etc. The optical switch is applicable in optical communication network node systems such as the optical cross connect (OXC) or optical add & drop multiplexer (OADM), so as to accomplish the functions of error restoration and exchange.

As shown in FIGS. 1 and 2, the conventional 2×2 optical switch 1 includes four collimators 11, 12, 13 and 14 and six reflectors 101, 102, 103, 104, 105 and 106, wherein the reflectors 101, 104, 105 and 106 are fixed, and the reflectors 102 and 103 are movable. Referring to FIG. 1, after the collimator 11 has received a first ray R1, the first ray R1 is reflected by the reflectors 101 and 102 and is received by the collimator 12 to be output therefrom. In addition, after the collimator 13 has received a second ray R2, the second ray R2 is reflected by the reflectors 103 and 104 and is received by the collimator 14 to be output therefrom. Referring to FIG. 2, after the reflectors 102 and 103 are removed, the collimator 11 receives the first ray R1, and the first ray R1 is reflected via the reflectors 101 and 104 and is received by the collimator 14 and not by the collimator 12. The collimator 13 receives the second ray R2 and the second ray R2 is reflected via the reflectors 105 and 106 and is received by the collimator 14 and not by the collimator 12. In other words, when the reflectors 102 and 103 are removed, the light transmission path can be switched.

Although the conventional 2×2 optical switch 1 achieves the objective of optical path switching, six reflectors are needed in this case. As a result, the cost of the switch is high, and the requirements for a light, thin, short and small in size of an optic-electro product cannot be achieved.

In view of the above, it is an imperative issue that needs to be overcome in order to reduce the production cost and to reduce the volume, weight and size of a 2×2 optical switch.

SUMMARY OF THE INVENTION

Accordingly, it is an objective of the invention to provide an optical switch, which is light, thin, short and small in size and the cost of production of the switch is low.

In order to achieve the above objective, the optical switch includes two optical input terminals, two optical output terminals, two reflecting devices and a movable device. The optical input terminals are used to receive light rays. The two reflecting devices are positioned at a fixed position and the movable device reflects light rays. When the position of the movable device moves, the light rays are reflected by one of the reflecting devices and are selectively output from the optical output terminals.

As a result of change in position of the reflecting devices and the movable device, the objective of switching the optical path of the light ray can be achieved by means of two reflecting devices and a movable device. Thus, the production cost of the 2×2 optical switch is greatly reduced, and in turn, the volume of the optical switch is reduced and the weight is lightened.

DETAILED DESCRIPTION OF THE PREFERRED EMBODIMENT

Figure 1:
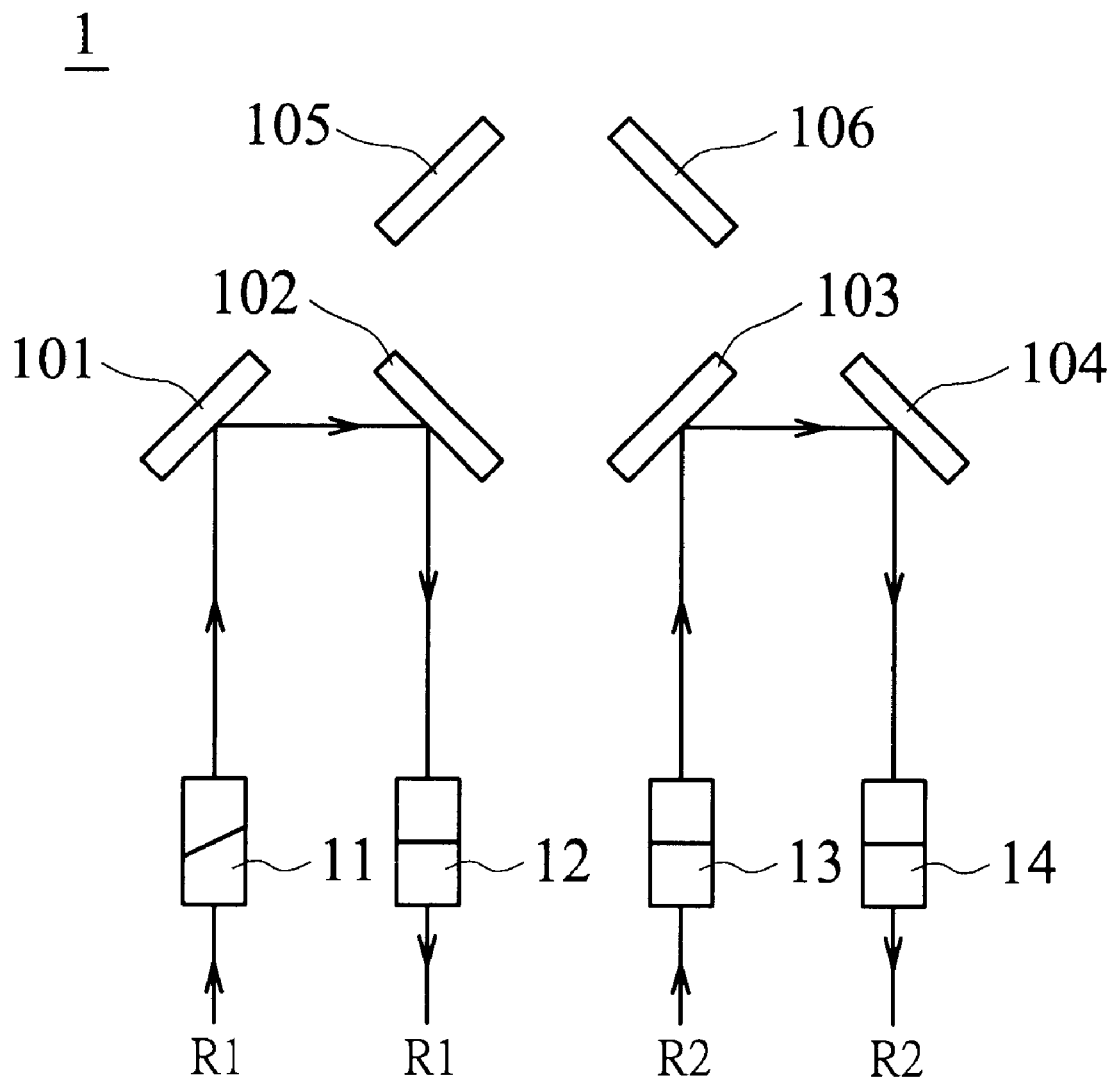
FIG. 1 is a schematic view showing a conventional 2×2 optical switch.
Figure 2:
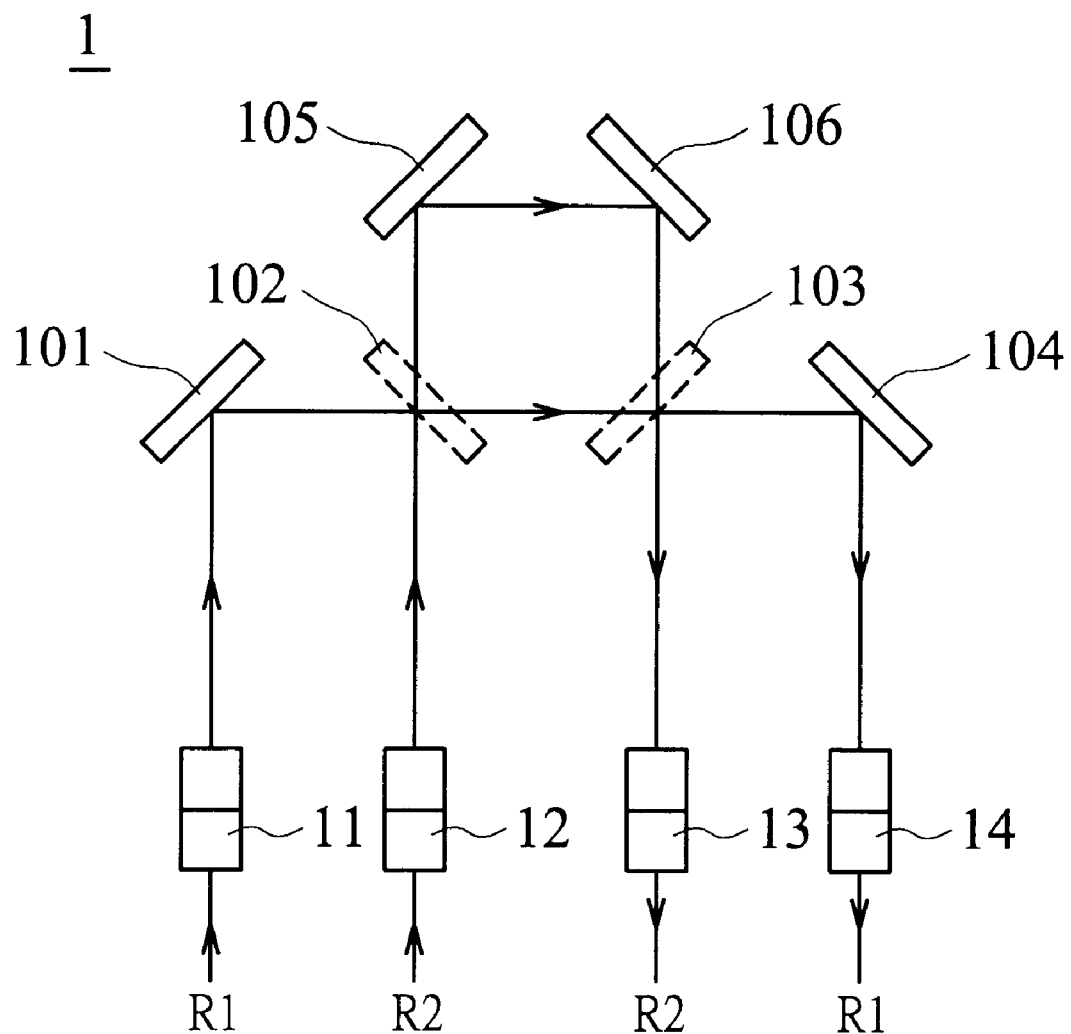
FIG. 2 is a schematic view showing a conventional 2×2 optical switch of another configuration.
Figure 3:
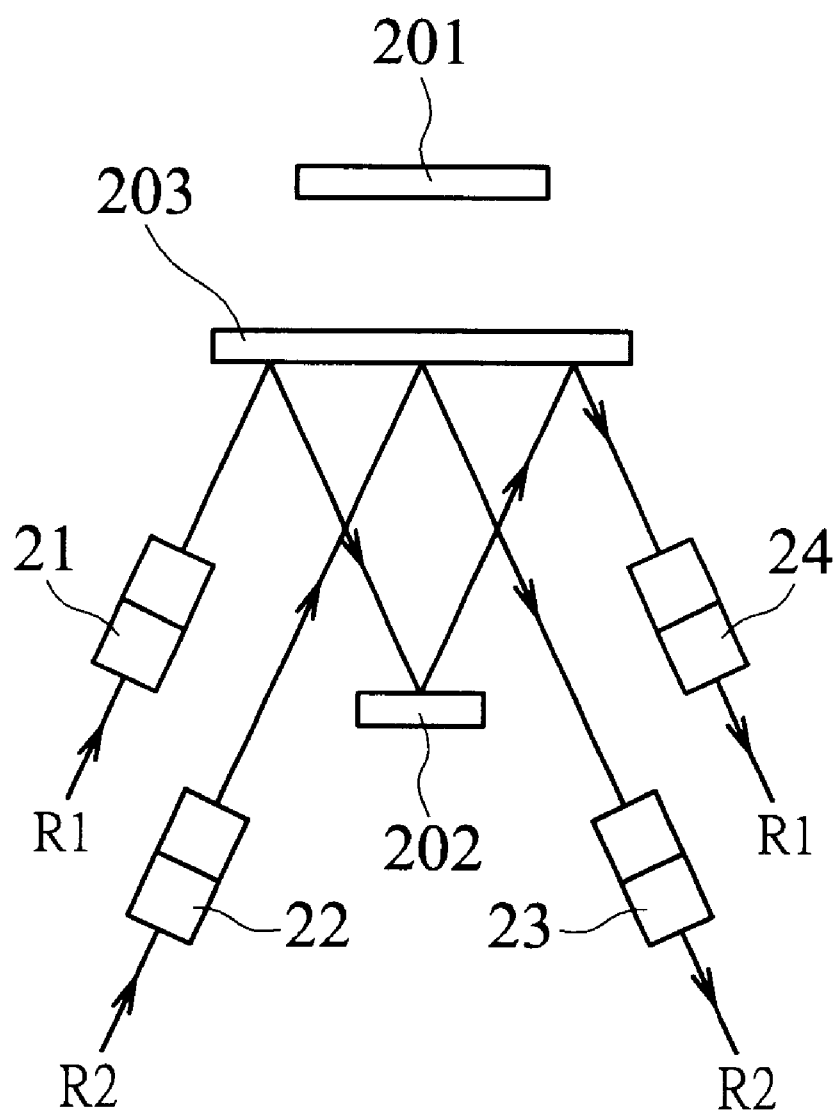
FIG. 3 is a schematic view showing a 2×2 optical switch of the invention.

As shown in FIG. 3, the 2×2 optical switch 2 of the embodiment has two optical input terminals, two optical output terminals, a first reflecting device 201, a second reflecting device 202 and a movable device 203. The optical input terminals are respectively provided with collimators 21, 22 to receive light rays such that the input light rays are incident to the optical device in parallel and the optical output terminals are respectively provided with collimators 23, 24 to transmit the light rays in parallel from the output terminals.

In accordance with the embodiment, the first reflecting device 201, the second reflecting device 202 and the movable device 203 can be reflectors, optical devices plated with reflecting films or coated with reflecting films, or other optical devices capable of reflecting the light rays. The first reflecting device 201 and the second reflecting device 202 are positioned at fixed positions and are respectively mounted at two opposed sides of the movable device 203. The movable device 203 can move along a direction which is perpendicular to the plan where transmission paths of the input or output light rays are located.

Referring to FIG. 3, when the movable device 203 is positioned between the first reflecting device 201 and the second reflecting device 202, the collimator 21 receives the first ray R1. The first ray R1 is incident onto the movable device 203 and is reflected via the movable device 203 to be reflected by the second reflecting device 202. Finally, the first ray R1 is reflected by the movable device 203 again to be output from the collimator 24. In addition, the collimator 22 receives the second ray R2 and the second ray R2 is incident onto the movable device 203 and is output from the collimator 23. Under such conditions, the first reflecting device 201 does not affect the first ray R1 and the second ray R2.

Figure 4:
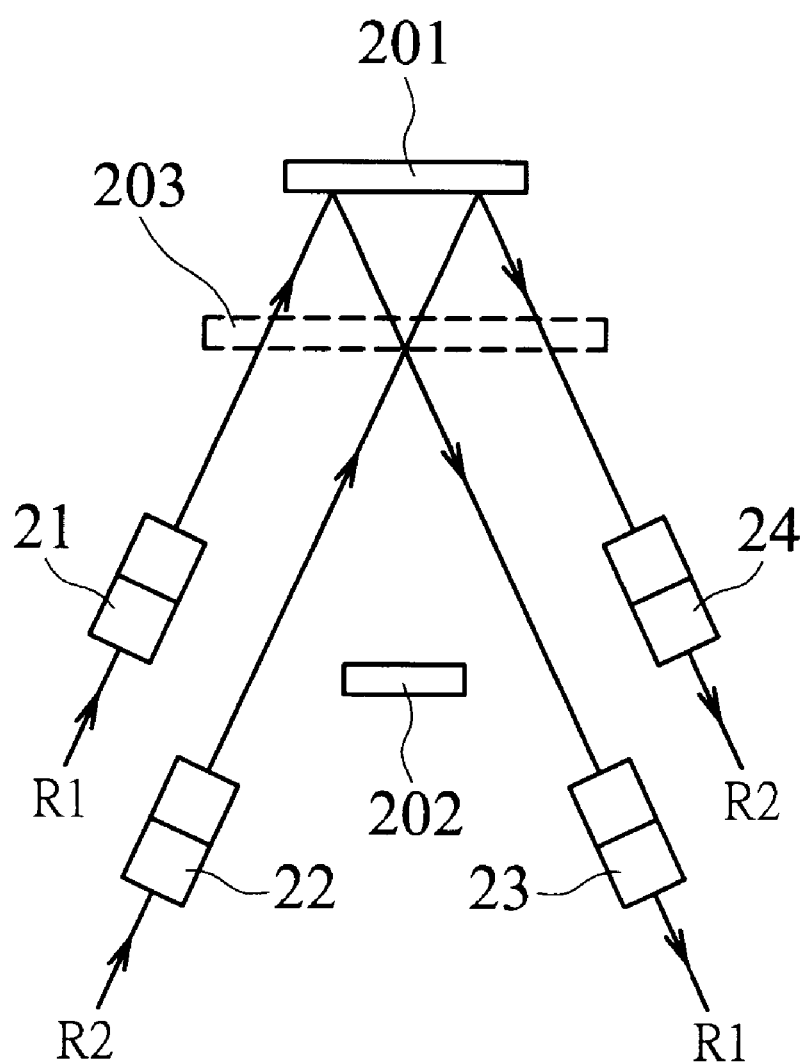
FIG. 4 is schematic view showing a 2×2 optical switch of another configuration in accordance with the invention.

As shown in FIG. 4, when the movable device 203 is removed along the plan perpendicular to the optical path and is not located between the first reflecting device 201 and the second reflecting device 202, the first ray R1 received by the collimator 21 is incident onto the first reflecting device 201 and is reflected by the first reflecting device 201 to be output from the collimator 23. Additionally, the second ray R2 received by the collimator 22 is incident onto the first reflecting device 201 and is reflected by the first reflecting device 201 to be output via the collimator 24. In this circumstance, the second reflecting device 202 does not affect the first ray R1 and the second ray R2.

In the present invention, the movable device 203 can be optionally positioned between the first reflecting device 201 and the second reflecting device 202. When the movable device 203 moves away from or moves in between the two reflecting devices 201, 202, the proceeding paths of the first ray R1 and the second ray R2 will be changed such that the output light ray is switched between the collimators 23 and 24. As the two reflecting devices and the movable device are positioned at specific positions, the light rays can be switched by means of two reflecting devices and one movable device, and thus the cost of the 2×2 optical switch is greatly reduced. At the same time, the requirements of a light, thin, short and small in size of an optical switch are attained. Moreover, it also takes less time in the precise positions of all required elements because the present invention utilizes fewer components in the optical switch.

While the invention has been described with respect to a preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

What is claimed is:

1. An optical switch comprising:
   two optical input terminals respectively receiving a light ray;
   two optical output terminals;
   two reflecting devices respectively fixed at a predetermined position; and
   a movable device for switching an optical path of the light ray;
   wherein when the movable device is disposed between the two reflecting devices, the light ray is reflected by the movable device, one of the reflecting devices, and the movable device in order to be received by one of the output terminals; and when the movable device is removed, the light ray is reflected by one of the reflecting devices to be received by the other of the output terminals.

2. The optical switch of claim 1, wherein the reflecting devices are respectively positioned at two opposed sides of the movable device.

3. The optical switch of claim 1, wherein the reflecting devices are positioned parallel to each other.

4. The optical switch of claim 1, wherein the optical input terminals and the optical output terminals are provided with collimators, respectively, which are obliquely disposed.

5. The optical switch of claim 1, wherein the moving direction of the movable device is perpendicular to the plan where an optical path of the light ray is located.

6. The optical switch of claim 1, wherein the reflecting devices are reflectors.

7. The optical switch of claim 1, wherein the movable device is a reflector.

8. The optical switch of claim 1, wherein the reflecting device is an optical device plated with a reflecting film.

9. The optical switch of claim 1, wherein the reflecting device is an optical device coated with a reflecting film.

10. The optical switch of claim 1, wherein the movable device is an optical device plated with a reflecting film.

11. The optical switch of claim 1, wherein the movable device is an optical device coated with a reflecting film.

12. An optical switch comprising:
    a first input terminal for receiving a first light ray;
    a second input terminal for receiving a second light ray;
    a first output terminal;
    a second output terminal;
    a first reflecting device disposed at a fixed position;
    a second reflecting device disposed opposite to the first reflecting device; and
    a movable device for switching optical paths of the first and second light rays;
    wherein when the movable device is disposed between the first and second reflecting devices, the first light ray is reflected by the movable device, the second reflecting device and the movable device in order to be received by the second output terminal, and the second light ray is reflected by the movable device to be received by the first output terminal; when the movable device is removed, the first light ray is reflected by the first reflecting device to be received by the first output terminal, and the second light ray is reflected by the first reflecting device to be received by the second output terminal.

13. The optical switch of claim 12, wherein the first and second reflecting devices are respectively positioned at two opposed sides of the movable device.

14. The optical switch of claim 12, wherein the first and second reflecting devices are positioned parallel to each other.

15. The optical switch of claim 12, wherein the first and second input terminals and the first and second optical output terminals are provided with collimators, respectively, which are obliquely disposed.

16. The optical switch of claim 12, wherein the moving direction of the movable device is perpendicular to the plan where an optical path of the light rays are located.

17. The optical switch of claim 12, wherein the first and second reflecting devices are reflectors.

18. The optical switch of claim 12, wherein the movable device is a reflector.

19. The optical switch of claim 12, wherein the first and second reflecting devices are optical devices plated with reflecting films.

20. The optical switch of claim 12, wherein the first and second reflecting devices are optical devices coated with reflecting films.

* * * * *